United States Patent
Hahn

(10) Patent No.: US 9,923,361 B2
(45) Date of Patent: Mar. 20, 2018

(54) 3 PHASE ELECTRIC LEAKAGE CURRENT CIRCUIT BREAKER WITH ELECTRIC SHOCK PROTECTION

(71) Applicant: LL Co., Ltd., Seoul (KR)

(72) Inventor: Song-Yop Hahn, Seoul (KR)

(73) Assignee: LL CO., LTD., Seoul (KR)

( * ) Notice: Subject to any disclaimer, the term of this patent is extended or adjusted under 35 U.S.C. 154(b) by 179 days.

(21) Appl. No.: 15/036,771

(22) PCT Filed: Oct. 23, 2014

(86) PCT No.: PCT/KR2014/010010
§ 371 (c)(1),
(2) Date: May 13, 2016

(87) PCT Pub. No.: WO2015/072672
PCT Pub. Date: May 21, 2015

(65) Prior Publication Data
US 2016/0301201 A1    Oct. 13, 2016

(30) Foreign Application Priority Data
Nov. 13, 2013    (KR) ........................ 10-2013-0137624

(51) Int. Cl.
*H02H 3/00* (2006.01)
*H02H 3/08* (2006.01)
*H02H 3/33* (2006.01)

(52) U.S. Cl.
CPC .............. *H02H 3/083* (2013.01); *H02H 3/33* (2013.01)

(58) Field of Classification Search
CPC ...................................... H02H 3/083
See application file for complete search history.

(56) References Cited

U.S. PATENT DOCUMENTS

| | | | | |
|---|---|---|---|---|
| 4,131,929 A | * | 12/1978 | Moran | H02H 3/083 361/93.5 |
| 4,161,761 A | * | 7/1979 | Moran | H02H 3/34 361/94 |
| 2003/0043516 A1 | * | 3/2003 | Ahlstrom | B23K 9/10 361/48 |

FOREIGN PATENT DOCUMENTS

| | | |
|---|---|---|
| CN | 2043021 U | 8/1989 |
| JP | 2009-079958 A | 4/2009 |

(Continued)

OTHER PUBLICATIONS

PCT: International Search Report of PCT/KR2014/010010 (related application), dated Feb. 2, 2015, 2 pgs.

(Continued)

*Primary Examiner* — Stephen W Jackson
(74) *Attorney, Agent, or Firm* — Munck Wilson Mandala, LLP

(57) ABSTRACT

The present invention relates to a 3 phase electric leakage current circuit breaker with electric shock protection having a first function of detecting a leakage current and operating a circuit breaker to break an electric path if a leakage current exceeds a tolerance and a second function of detecting a leakage current every half cycle intervals of a power source, subtracting two leakage currents detected before and after a half cycle interval from each other as a vector calculus to compute a leakage current change, and operating a circuit breaker to break an electric path if the leakage current change exceeds a tolerance. The former case corresponds to protection against a normal leakage current which gradually increases, and an allowable leakage current is several hundreds of mA. The latter case is for protection against electric shock to a human body when a leakage current abruptly changes due to electric shock to a human body or the like, and an allowable leakage current is several tens of mA.

(Continued)

Therefore, along the 3 phase electric path, the electric leakage current circuit breaker of the present invention may operate without any malfunction with respect to the normal leakage current change while protecting the human body from the electric shock.

2 Claims, 3 Drawing Sheets

(56) References Cited

FOREIGN PATENT DOCUMENTS

| | | |
|---|---|---|
| KR | 10-0792942 B1 | 1/2008 |
| KR | 10-1024077 B1 | 3/2011 |
| KR | 10-1225125 B1 | 1/2013 |

OTHER PUBLICATIONS

SIPO: Office Action for CN Patent Application No. 201480061017.6 (related application); Nov. 30, 2017; 4 pgs.; (Chinese language). Office Action includes rejection of Claim 1 on grounds of obviousness/lack of inventive-step over the cited reference.

\* cited by examiner

[Fig.1]
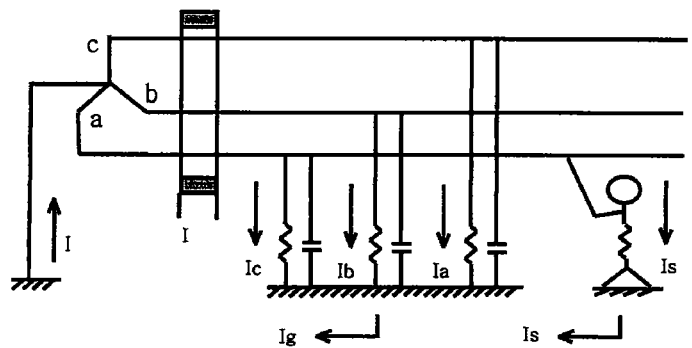
[Fig. 2]
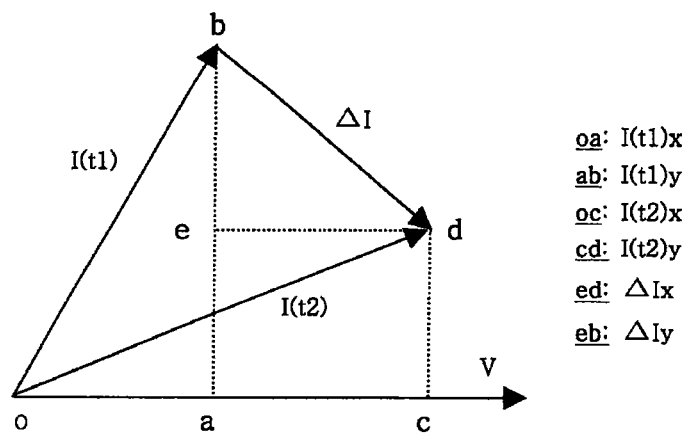
oa: $I(t1)x$
ab: $I(t1)y$
oc: $I(t2)x$
cd: $I(t2)y$
ed: $\Delta Ix$
eb: $\Delta Iy$
[Fig. 3]
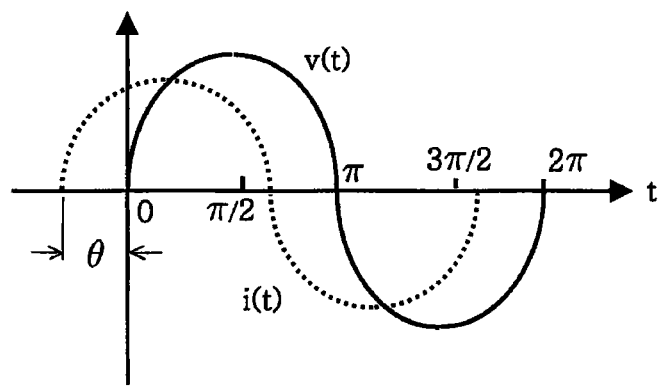

[Fig. 4]
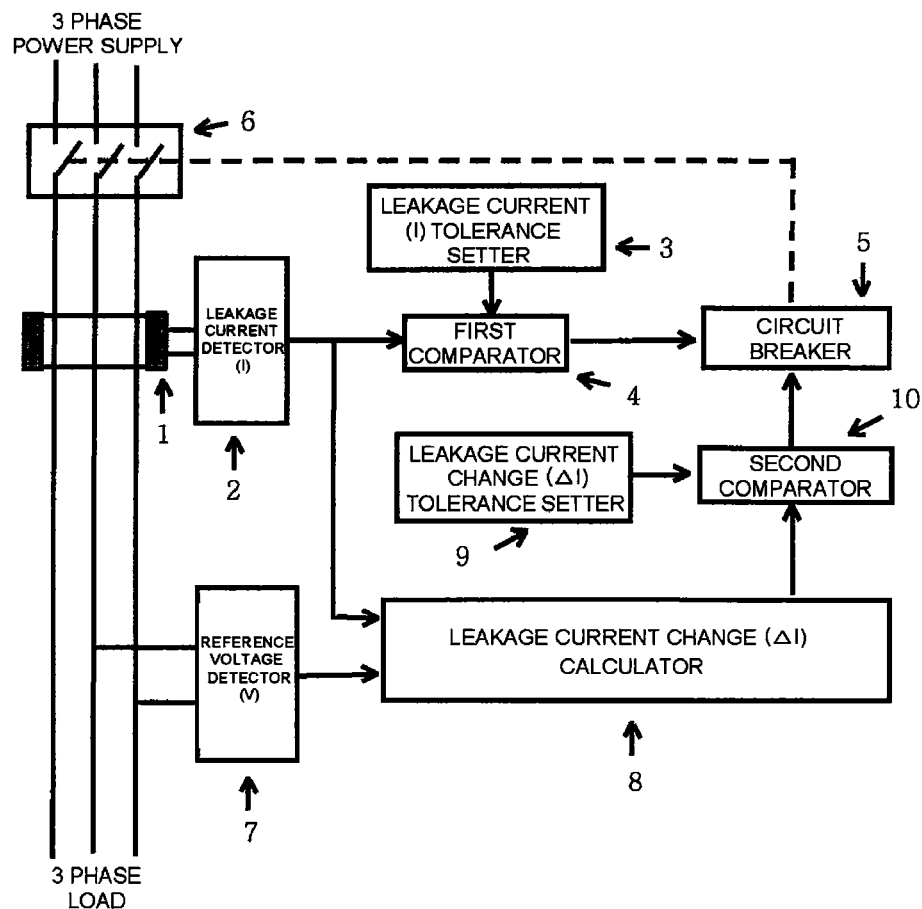
[Fig. 5]
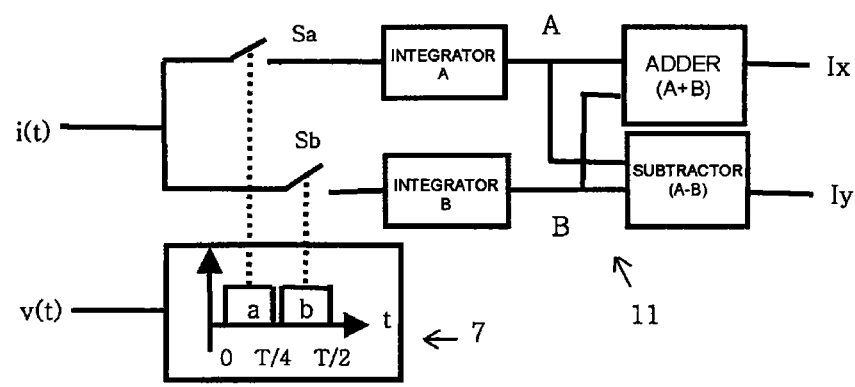

[Fig. 6]
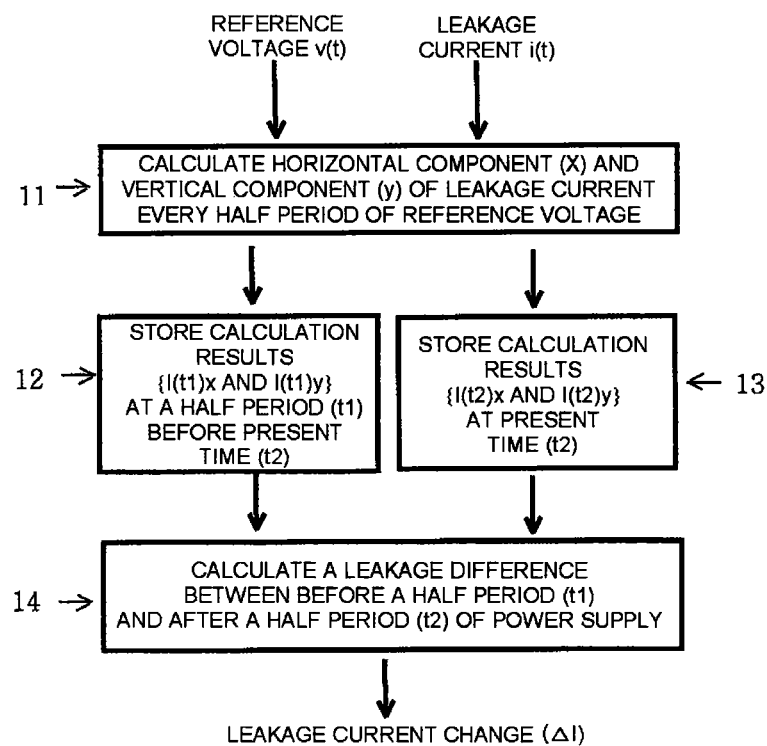

3 PHASE ELECTRIC LEAKAGE CURRENT CIRCUIT BREAKER WITH ELECTRIC SHOCK PROTECTION

CROSS-REFERENCE TO RELATED APPLICATIONS

This application is a U.S. National Phase application submitted under 35 U.S.C. § 371 of Patent Cooperation Treaty Application No. PCT/KR2014/010010, filed Oct. 23, 2014, published on May 21, 2015, as Publication No. WO/2015/072672, which application claims priority to Korean patent Application No. 10-2013-0137624, filed Nov. 13, 2013.

Patent Cooperation Treaty Application No. PCT/KR2014/010010, Korean patent Application No. 10-2013-0137624, and Patent Application Publication No. WO/2015/072672 are hereby incorporated by reference.

TECHNICAL FIELD

The present invention relates to a 3 phase electric leakage current circuit breaker with electric shock protection, and more particularly to a 3 phase electric leakage current circuit breaker, which may protect against a normal current leakage occurring at ordinary time due to the change of self capacitance or ground insulation resistance along a 3 phase electric path and also protect against a current leakage occurring at electric shock to a human body.

BACKGROUND

A 3 phase electric leakage current circuit breaker commercially used at the present generally has a sensitivity current of several hundreds of mA. For example, when a 3 phase electric leakage current circuit breaker having a sensitivity current of 150 mA is used, if a leakage current detected at a 3 phase zero phase current transformer (ZCT) exceeds 150 mA, the electric leakage current circuit breaker operates. For example, in a state where a normal leakage current of 90 mA flows along a 3 phase electric path at ordinary time, if a short current of 30 mA abruptly flows to the ground due to an electric short of a human body and thus a leakage current of 120 mA is detected from the zero phase current transformer (ZCT), even though a short current dangerous to the human body flows, the electric leakage current circuit breaker does not operate since the leakage current detected from the zero phase current transformer (ZCT) is lower than the sensitivity current of 150 mA of the electric leakage current circuit breaker. In other words, most 3 phase electric leakage current circuit breakers presently used are not able to protect electric shock to a human body.

SUMMARY AND DISCLOSURE

Technical Problem

The present invention is directed to providing a 3 phase electric leakage current circuit breaker, which may protect against a normal current leakage occurring at ordinary time due to the change of self capacitance or ground insulation resistance along a 3 phase electric path and also protect against a current leakage occurring at electric shock to a human body.

Technical Solution

To solve the above problem, from the fact that a leakage current changes slowly at ordinary time while a leakage current at electric shock to a human body changes abruptly, the present invention proposes a method for calculating an abruptly changing leakage current, namely a leakage current at electric shock to a human body, from the leakage current detected at a zero phase current transformer.

In this method, the zero phase current transformer successively detects a leakage current at relatively short time intervals, and a vector difference (subtraction) between a present leakage current and a previous leakage current is computed in real time to calculate an abruptly changing leakage current, namely a leakage current generated by electric shock to a human body.

Therefore, if a leakage current detected at the zero phase current transformer (ZCT) exceeds a reference value, for example 150 mA, or an abruptly changing leakage current exceeds, for example, 30 mA, the 3 phase electric leakage current circuit breaker of the present invention breaks an electric path, thereby allowing protection against not only electric shock caused by a normal current leakage at ordinary time but also electric shock to a human body.

In one general aspect, the present invention provides a 3 phase electric leakage current circuit breaker, comprising: a contact configured to break 3 phase power; a zero phase current transformer; a leakage current detector configured to detect a leakage current at the zero phase current transformer; a leakage current tolerance setter; a first comparator configured to compare the leakage current detection value detected by the leakage current detector with a leakage current tolerance set by the leakage current tolerance setter; a leakage current change calculator configured to compute a leakage current change which have changed during a half cycle by detecting the leakage current at half cycle intervals of the 3 phase power and subtracting vector values of two leakage currents detected before and after the half cycle; a leakage current change tolerance setter; a second comparator configured to compare the leakage current change calculation value calculated by the leakage current change calculator with a leakage current change tolerance set by the leakage current change tolerance setter; and a circuit breaker configured to operate to open the contact when the leakage current detection value exceeds the leakage current tolerance or when the leakage current change calculation value exceeds the leakage current change tolerance.

In another aspect of the present invention, the 3 phase electric leakage current circuit breaker may further include a reference voltage detector configured to detect a reference voltage, the leakage current change calculator may include: a horizontal component and vertical component calculator configured to calculate a horizontal component and a vertical component of a leakage current every half cycle of the reference voltage; a pre-half-cycle calculation result memory device and a post-half-cycle calculation result memory device configured to store calculation results of the horizontal component and the vertical component before and after each half cycle; and a leakage current subtractor configured to calculate a difference between the pre-half-cycle calculation result and the post-half-cycle calculation result, and the leakage current change calculator may compute a leakage current change by dividing two leakage currents detected before and after a half cycle of the 3 phase power into horizontal components and vertical components with respect to the reference voltage, respectively.

In another aspect of the present invention, the reference voltage detector may select any line-to-line voltage at the 3 phase power to repeatedly generate a first square wave voltage at a first T/4 of the half cycle and a second square wave voltage at a second T/4 of the half cycle during every half cycle (T/2) of the 3 phase power, the horizontal component and vertical component calculator may include: a first switch configured to operate with the first square wave voltage; a second switch configured to operate with the second square wave voltage; a first integrator configured to calculate a first integration value by integrating an instantaneous value of a leakage current in the first T/4 when the first switch is operating; a second integrator configured to calculate a second integration value in the second T/4 when the second switch is operating; an adder configured to compute a horizontal component by adding the first integration value and the second integration value; and a subtractor configured to compute a vertical component by subtracting the second integration value from the first integration value, and thus the horizontal component and vertical component calculator may compute horizontal components and vertical components with respect to the reference voltage of the two leakage currents.

In another aspect of the present invention, the leakage current tolerance of the leakage current tolerance setter is 50 mA to 500 mA, and the leakage current change tolerance of the leakage current change tolerance setter is 15 mA to 30 mA.

Advantageous Effects

If the electric leakage current circuit breaker of the present invention is applied to a 3 phase electric path, it is possible to greatly prevent a person from being damaged or killed by electric shock to a human body along the 3 phase electric path.

BRIEF DESCRIPTION OF THE DRAWINGS

For a more complete understanding, reference is now made to the following description taken in conjunction with the accompanying Drawings in which:

FIG. 1 shows a path of a normal leakage current Ig at ordinary time and a leakage current Is at electric shock to a human body along a 3 phase electric path.

FIG. 2 shows a diagram dividing a leakage current I(t1) at time t1 and a leakage current I(t2) at time t2 into a horizontal component and a vertical component for a reference voltage V, respectively.

FIG. 3 shows an instantaneous value i(t) of a leakage current and an instantaneous value v(t) of a reference voltage, where the leakage current has a phase shift ahead of the reference voltage by θ.

FIG. 4 shows a schematic inner configuration of a 3 phase electric leakage current circuit breaker with electric shock protection according to an embodiment of the present invention.

FIG. 5 shows a relation between an output of a reference voltage detector and a leakage current horizontal component and vertical component calculator.

FIG. 6 shows a detailed inner configuration of a leakage current change (ΔI) calculator 8 depicted in FIG. 4.

DETAILED DESCRIPTION AND BEST MODE

FIG. 1 shows a path of a leakage current generated at a 3 phase electric path. At ordinary time, leakage currents Ia, Ib, Ic flow to the ground according to self capacitance and ground insulation resistance of each phase, on Phase a, Phase b and Phase c. Therefore, a leakage current Ig (Ig=Ia+Ib+Ic) where leakage currents Ia, Ib, Ic of every phase are added as a vector calculus flows in the ground. In addition, a leakage current I detected at a 3 phase zero phase current transformer (ZCT) becomes a leakage current Ig. In other words, I=Ig.

However, if electric shock to a human body abruptly occurs at Phase a as shown in FIG. 1, a short current Is flows to the ground at Phase a. Therefore, the leakage current I detected at the zero phase current transformer (ZCT) becomes a leakage current obtained by adding the leakage current Ig flowing at ordinary time and the short current Is which has abruptly occurred. In other words, I=Ig+Is.

The leakage current flowing in an electric path at ordinary time flows according to self capacitance and ground insulation resistance of the electric path, and here, the leakage current varies due to the influence of temperature, humidity, dust or the like around the electric path, and particularly, the leakage current slowly or gradually increases due to the degradation caused by an aging effect of an insulating material. Meanwhile, the short current of a human body abruptly increases at electric shock accident.

In the present invention, from the fact that a leakage current increases slowly at ordinary time and a leakage current changes abruptly at electric shock to a human body, there is proposed a method for calculating a leakage current at electric shock to a human body in real time. In addition, since an electric leakage breaking time should be set to be within 30 ms to protect electric shock to a human body according to Korean Industrial Standards (KS), a leakage current computing time caused by electric shock to a human body should be set to be within 10 ms to 20 ms.

In the present invention, the zero phase current transformer (ZCT) detects a leakage current every half cycle (about 8.3 ms in case of an 60 Hz AC power source) of a power source and subtracts a leakage current detected before a half cycle from the presently detected leakage current to compute a leakage current varying during the half cycle. Assuming that a leakage current just before electric shock accident is I(t1) and a leakage current just after the electric shock accident is I(t2) in FIG. 1, I(t1)=Ig, and I(t2)=Ig+Is, and thus the leakage current Is caused by the electric shock accident may be computed from Is=I(t2)−I(t1).

Therefore, a technique for calculating a change of a leakage current every half cycle of a power source as a vector calculus is demanded.

In the present invention, leakage currents before and after a half cycle (T/2) of the power source are subtracted as a vector calculus to compute a leakage current which has changed during the half cycle. In other words, assuming that a leakage current at time t1 is I(t1) and a leakage current at time t2 (t2=t1+T/2) is I(t2), the leakage current I(t1) is subtracted from the leakage current I(t2) as a vector calculus to compute a leakage current ΔI which have changed during the half cycle.

As shown in FIG. 2, first, line-to-line voltages of a 3 phase power, for example, line-to-line voltages V of Phase a and Phase b, are set as a reference voltage, and a horizontal component (x) and a vertical component (y) are calculated with respect to the reference voltage V for the leakage currents I(t1) and I(t2), as follows.

$$I(t1)=I(t1)x+I(t1)y \quad (1)$$

$$I(t2)=I(t2)x+I(t2)y \quad (2)$$

Next, a difference Δlx of the horizontal components of two leakage currents and a difference Δly of the vertical components thereof are obtained.

$$\Delta Ix=I(t2)x-I(t1)x \quad (3)$$

$$\Delta Iy=I(t2)y-I(t1)y \quad (4)$$

Therefore, the difference ΔI of two leakage currents may be obtained as follows.

$$\Delta I = \text{sqrt}\{\Delta Ix * \Delta Ix + \Delta Iy * \Delta Iy\} \quad (5)$$

A key feature of the present invention is to rapidly divide the leakage current I into a component parallel to the reference voltage V and a component perpendicular thereto. In the present invention, the leakage current I is integrated during a half cycle of the reference voltage V to obtain a horizontal component (x) and a vertical component (y). In other words, an integration is used.

A. Method for Dividing a Leakage Current I into a Horizontal Component Ix and a Vertical Component Iy for a Reference Voltage V FIG. 3 shows an instantaneous value i(t) of the leakage current I and an instantaneous value v(t) of the reference voltage V. i(t) has a phase shift ahead of v(t) by θ, as follows.

$$v(t) = \sqrt{2} V \sin(\omega t) \quad (6)$$

$$i(t) = \sqrt{2} I \sin(\omega t + \theta) \quad (7)$$

Wherein, ω=2πf, and f is a frequency of the power source. Equation (7) may be resolved as follows.

$$i(t) = \sqrt{2}\{Ix \sin(\omega t) + Iy \cos(\omega t)\} \quad (8)$$

Here, $$Ix = I \cos\theta, Iy = I \sin\theta \quad (9)$$

If a value obtained by integrating i(t) of Equation (8) from 0 to π/2 is A and a value obtained by integrating from π/2 to π is B, the following is obtained.

$$A = \int_0^{\pi/2} i(t) d(\omega t), B = \int_{\pi/2}^{\pi} i(t) d(\omega t) \quad (10)$$

This may be calculated as follows.

$$A = \sqrt{2}\{Ix + Iy\}, B = \sqrt{2}\{Ix - Iy\} \quad (11)$$

From Equation (11), the following equation is obtained.

$$Ix = \{A + B\}/2\sqrt{2}, Iy = \{(A - B)\}/2\sqrt{2} \quad (12)$$

Therefore, if the instantaneous value i(t) of the leakage current I is integrated in real time to obtain A and B, a horizontal component Ix and a vertical component Iy of the leakage current I may be obtained from Equation (12) every half cycle of the power supply.

B. Configuration of the Electric Leakage Current Circuit Breaker

FIG. 4 shows a configuration of the electric leakage current circuit breaker according to the present invention. The electric leakage current circuit breaker operates in two situations as follows.

First, the electric leakage current circuit breaker operates if the normal leakage current I exceeds an allowable tolerance of the leakage current I, which is a function of an existing electric leakage current circuit breaker. To perform this function, a zero phase current transformer 1, a leakage current detector 2, a leakage current I tolerance setter 3, a first comparator 4, a circuit breaker 5 and a contact 6, commonly used in the art, are provided. The first comparator 4 compares the leakage current I detected by the leakage current detector 2 with a tolerance, for example 150 mA, of the leakage current I, set by the tolerance setter 3, and if the detected leakage current I exceeds the set tolerance, the circuit breaker 5 operates to open (off) the contact 6.

Second, the electric leakage current circuit breaker operates if the leakage current I instantaneously changes due to electric shock to a human body. If the leakage current change ΔI exceeds a tolerance of the leakage current change ΔI, the electric leakage current circuit breaker operates, and this function is proposed in the present invention. To perform this function, a reference voltage detector 7, a leakage current change ΔI calculator 8, a leakage current change ΔI tolerance setter 9 and a second comparator 10 are additionally provided. The second comparator 10 compares the leakage current change ΔI computed by the leakage current change calculator 8 with a tolerance, for example 30 mA, of the leakage current change ΔI, set by the tolerance setter 9, and if a leakage current change ΔI calculated by comparison exceeds the set tolerance, the circuit breaker 5 operates to open (off) the contact 6.

The reference voltage detector 7 selects any line-to-line voltage at the 3 phase power to repeatedly generate a square wave voltage a from t=0 (θ=0) to t=T/4 (θ=π/2) and a square wave voltage b from t=T/4 (θ=π/2) to t=T/2 (θ=π) during every half cycle (T/2) of the power supply, as shown in FIG. 5.

The leakage current change ΔI calculator 8 calculates a change of the leakage current I during a half cycle of the power supply, and includes a leakage current horizontal component (x) and vertical component (y) calculator 11, a pre-half-cycle calculation result memory device 12 and a post-half-cycle calculation result memory device 13, and a leakage current subtractor 14, as shown in FIG. 6.

The leakage current horizontal component (x) and vertical component (y) calculator 11 is composed of a switch Sa operating with the square wave voltage a, a switch Sb operating with the square wave voltage b, an integrator A, an integrator B, an adder and a subtractor, as shown in FIG. 5. If the switch Sa operates (on), the integrator A integrates i(t) from t=0 (θ=0) to t=T/4 (θ=π/2) as in Equation (10) to calculate A, and if the switch Sb operates (on), the integrator B integrates i(t) from t=T/4 (θ=π/2) to t=T/2 (θ=π) as in Equation (10) to calculate B. And then, if A and B are added by the adder, a horizontal component Ix of the leakage current is obtained as in Equation (12), and if B is subtracted from A by the subtractor, a vertical component Iy of the leakage current is obtained.

The pre-half-cycle calculation result memory device 12 stores a calculation result before a half cycle (t1) from the present time (t2), and the post-half-cycle calculation result memory device 13 stores a calculation result at the present time (t2). In other words, the pre-half-cycle calculation result memory device 12 stores a horizontal component I(t1)x and a vertical component I(t1)y of the leakage current I(t1), and the post-half-cycle calculation result memory device 13 stores a horizontal component I(t2)x and a vertical component I(t2)y of the leakage current I(t2).

The leakage current subtractor 14 subtracts the horizontal component I(t1)x and the vertical component I(t1)y of the leakage current I(t1) before the half cycle (t1) of the power supply, stored in the pre-half-cycle calculation result memory device 12, from the horizontal component I(t2)x and the vertical component I(t2)y of the leakage current I(t2) at the present time (t2), stored in the post-half-cycle calculation result memory device 13, to calculate a leakage current change ΔI during the half cycle (t2−t1) by using Equation (3), Equation (4) and Equation (5). The leakage current change ΔI is an abruptly changing leakage current, and generally appears when a leakage current Is occurs due to electric shock.

Though the present invention has been described as above on the basis of specific embodiments and drawings, the present invention may be changed or modified in various ways by those having ordinary skill in the art without departing from the scope of the present invention.

INDUSTRIAL APPLICABILITY

Electric shock to a human body generated at a 3 phase electric path has substantially not protected so far. However, with the electric leakage current circuit breaker of the present invention applied to the 3 phase electric path, it is possible to greatly prevent a person from being damaged or killed by electric shock to a human body along the 3 phase electric path.

REFERENCE SYMBOLS

1: zero phase current transformer (ZCT)
2: leakage current detector
3: leakage current tolerance setter
4: first comparator
5: circuit breaker
6: contact
7: reference voltage detector
8: leakage current change calculator
9: leakage current change tolerance setter
10: second comparator

The invention claimed is:

1. A 3 phase electric leakage current circuit breaker, comprising:
   a 3 phase zero phase current transformer;
   a leakage current detector for detecting a leakage current at the 3 phase zero phase current transformer;
   a reference voltage detector for selecting any line-to-line voltage at 3 phase power as a reference voltage; and
   a leakage current change calculator configured to compute a leakage current change which have changed during a half cycle by detecting the leakage current every half cycle interval of the reference voltage and subtracting vector values of two leakage currents detected before and after the half cycle interval;
   wherein the leakage current change calculator includes:
      a horizontal component and vertical component calculator configured to calculate a horizontal component and a vertical component of a leakage current every half cycle of the reference voltage;
      a pre-half-cycle calculation result memory device and a post-half-cycle calculation result memory device configured to store calculation results of the horizontal component and the vertical component before and after each half cycle; and
      a leakage current subtractor configured to calculate a difference between the pre-half-cycle calculation result and the post-half-cycle calculation result,
   thereby computing the leakage current change by dividing two leakage currents detected before and after a half cycle of the reference voltage into horizontal components and vertical components with respect to the reference voltage, respectively.

2. The 3 phase electric leakage current circuit breaker according to claim 1,
   wherein the reference voltage detector repeatedly generates a first square wave voltage in a first T/4 of the half cycle (T/2) and a second square wave voltage in a second T/4 of the half cycle during each half cycle (T/2) of the reference voltage,
   wherein the horizontal component and vertical component calculator includes:
      a first switch configured to operate with the first square wave voltage;
      a second switch configured to operate with the second square wave voltage;
      a first integrator configured to calculate a first integration value by integrating an instantaneous value of a leakage current for the first T/4 when the first switch is operating;
      a second integrator configured to calculate a second integration value for the second T/4 when the second switch is operating;
      an adder configured to compute a horizontal component by adding the first integration value and the second integration value; and
      a subtractor configured to compute a vertical component by subtracting the second integration value from the first integration value,
   thereby computing the horizontal components and vertical components with respect to the reference voltage of the two leakage currents.

* * * * *